United States Patent [19]

Williams, Jr.

[11] Patent Number: 4,524,844

[45] Date of Patent: Jun. 25, 1985

[54] ANTI-DIVE FRONT WHEEL SUSPENSION SUITABLE FOR MOTORCYCLE

[75] Inventor: John E. Williams, Jr., Duquesne, Pa.

[73] Assignee: AAKAC Industries Inc., Apollo, Pa.

[21] Appl. No.: 465,523

[22] Filed: Feb. 10, 1983

[51] Int. Cl.³ .............................................. B62K 25/08
[52] U.S. Cl. .................................... 180/219; 280/276
[58] Field of Search ................... 280/276, 277, 703; 180/219, 210

[56] References Cited

U.S. PATENT DOCUMENTS 3,989,261  11/1976  Kawaguchi .................. 280/276
4,145,067   3/1979  Ceriani ....................... 280/276
4,295,658  10/1981  Kashima ...................... 280/276
4,392,664   7/1983  Tsuchiya et al. ............. 280/276

Primary Examiner—John A. Pekar
Attorney, Agent, or Firm—Andrew Alexander

[57] ABSTRACT

There is disclosed a telescopic front-end suspension system suitable for a motorcycle or motorized tricycle or the like. The suspension comprises a front fork assembly having a pair of top tubes telescopically received in a pair of bottom tubes or sliders. Spring means are carried on or in the tubes and means for damping the spring action including liquid or oil are carried in the tubes. A gas chamber or space is provided in connection with the tubes for permitting gas or damping liquid to escape thereto when the top and bottom tubes are telescopically compressed, the compression raising the level of the liquid in the top tube. A control means is provided for restricting the flow of gas or damping liquid from the tubes to the chamber upon application of at least the front brake, the restriction of gas or damping liquid flow resulting in the telescopic compression of the tubes being restrained.

18 Claims, 4 Drawing Figures

ANTI-DIVE FRONT WHEEL SUSPENSION SUITABLE FOR MOTORCYCLE

INTRODUCTION

This invention relates to telescopic front fork assembly for motorcycles, motorized tricycles and the like and more particularly it relates to an anti-dive system for a front fork assembly.

On riding a motorcycle, it is well known that application of the front brake, pulls the front end down or collapses the front suspension of the motorcycle. When front suspensions only utilized 4 or 5 inches of travel the effect on braking was not particularly severe or detrimental, even though undesirable since very little suspension remains. With the advent of long suspension e.g. 12 to 13 inches, particularly used in competition such as motocross, the dive or collapse of the front suspension on using the front brake becomes much more pronounced and interferes rather severely with stability. It should be understood that the longer suspensions permit of much higher speeds especially over rough terrain. Further, it should be understood that to a large extent, the front brake provides much greater stopping capability than the back brake. Accordingly, use of the front brake and the attendant collapse of the front suspension interfers with the motorcycle stability by tilting the front of the motorcycle severely downwardly from the normal riding level. Obviously, having the front end pulled down at a severe angle results in an unnatural position for the rider and a high degree of awkwardness, particularly at a time when the braking is being done in order to turn a corner. Further, having the front end pulled down shortens the wheel base of the motorcycle when the speed is often rather high also interfering with stability. With respect to riding down hills, the angle of the hill in addition to the angle of motorcycle when the front brake is utilized can result in the highest mode of instability.

In the prior art, one attempt at solving the problem resulted essentially in replacing the telescoping forks with a series of links using shock absorbers with helical springs. However, this type of assembly only saw very limited usage probably because any advantage was essentially offset by the additional weight of the linkage.

U.S. Pat. No. 3,989,261 discloses a means for restraint of compression of the forks upon braking. However, this system uses a bell-crank and linkage which is believed would be rather cumbersome when used with longer suspension. Thus, it will be appreciated that there is a great need to solve the problem of front suspension collapse on motorcycles when the front brake is applied.

SUMMARY OF THE INVENTION

An object of the invention is to provide a front suspension system which restrains compression of the front forks upon use of the front brake.

Another object of the invention is to provide a front suspension system which resists compression of the front forks and still permits limited operation of the suspension.

Yet another object of the present invention is to provide a front suspension system which resists compression or permits only partial compression of the front forks upon application of the front brake and yet permits extension of the forks while controlling the compression.

And yet another object of the present invention is to provide an apparatus which may be fitted to a conventional telescopic suspension to enable them to resist compression upon use of the motorcycle brakes.

These and other objects will be apparent from the drawings, specification and claims appended hereto.

In accordance with these objects there is disclosed a telescopic front-end suspension system suitable for a motorcycle or motorized tricycle or the like. The suspension comprises a front fork assembly having a pair of top tubes telescopically received in a pair of bottom tubes or sliders. Spring means are carried on or in the tubes and means for damping the spring action including liquid or oil are carried in the tubes. A gas chamber or space is provided in connection with the tubes for permitting gas to escape thereto when the top and bottom tubes are telescopically compressed, the compression raising the level of the liquid in the top tube. A control means is provided for restricting the flow of gas in or from the top tube to the chamber upon application of the front brake, the restriction of gas flow restraining the telescopic compression of the tubes.

DETAILED DESCRIPTION OF THE PREFERRED EMBODIMENTS

Figure 1:
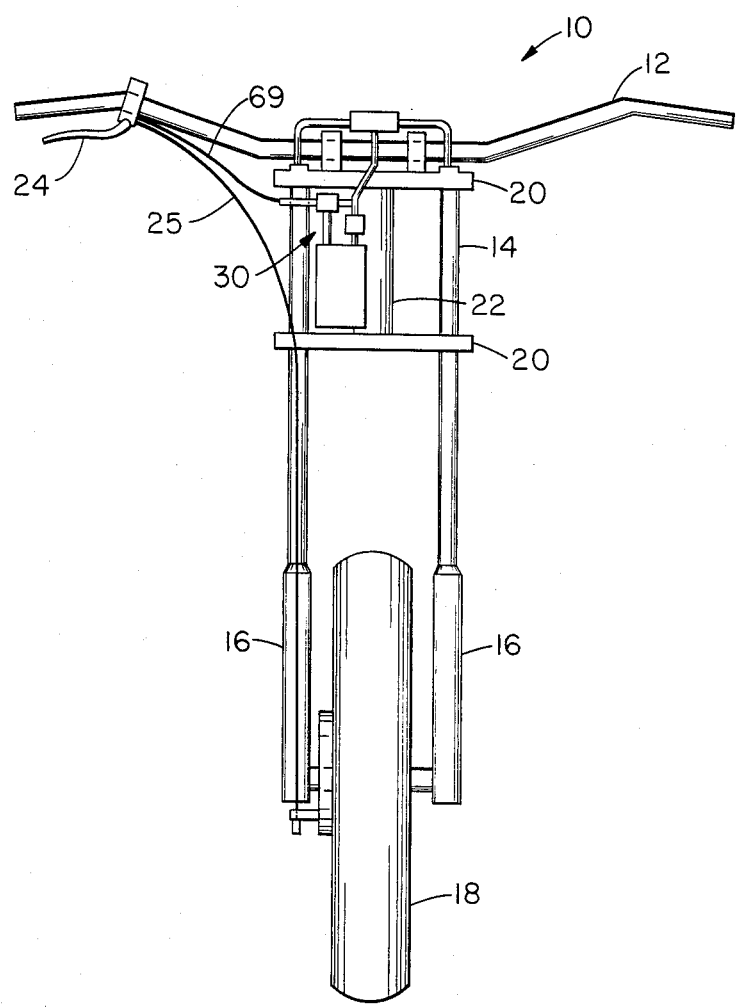
FIG. 1 is a frontal schematic view of a motorcycle illustrating one embodiment of the anti-compression system in accordance with the invention.

Referring now to FIG. 1 there is illustrated schematically the frontal section or fork assembly of a motorcycle or motorized tricycle or the like referred to generally as 10. In this view there are shown handlebars 12, upper tubes 14 and lower tubes 16 carrying wheel 18. Upper tubes 14 are shown substantially parallel and telescopically mounted in lower or bottom tubes 16. Upper tubes 14 are held in a spaced relationship to each other by means of triple clamps 20 which in turn are rotatably or pivotally connected or carried on frame member 22. Member 22 is connected to the frame (not shown) which carries the engine, gas tank and seat, etc. The top triple clamp is provided with fastener means for securely attaching handlebars 12 thereto. A front brake lever 24 is shown carried on handlebars 12. The anti-dive or anti-compression system referred to generally as 30 in accordance with the invention is shown mounted between triple clamps 20 and activated by front brake lever 24.

Figure 2:
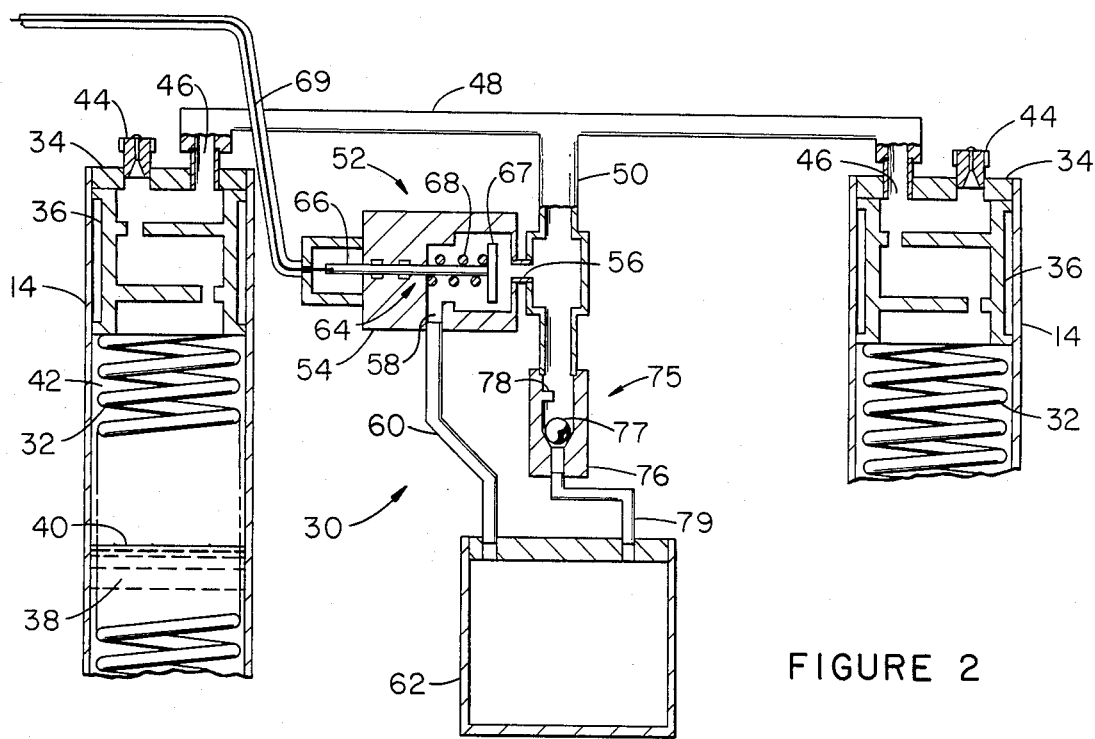
FIG. 2 is a cross-sectional view of the top tubes of the front fork assembly of a motorcycle illustrating one embodiment of the invention.
Figure 2A:
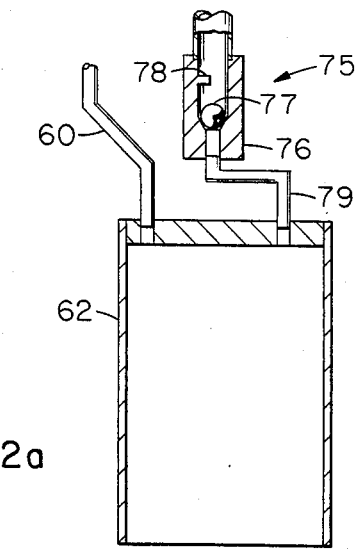
FIG. 2a is a cross-sectional view showing a gas chamber open to the atmosphere.

Referring now to FIG. 2, there is schematically represented in detail an anti-compression system for a telescoping front fork suspension in accordance with the invention. Thus, there is shown the top portion of top or upper tubes 14 and connected thereto is anti-compression system 30. In tubes 14, there is shown a coil or helical spring 32. The tubes are fitted with caps 34 which carry a gas air valve 44. The caps serve to retain the springs 32. Spacer 36 can be provided between springs 32 and caps 34. The spacers not only serve to prevent the springs from impinging directly on the caps but also serve another important function as will be explained below. Also, in upper tubes 14 there is shown oil or liquid 38 which has a level 40. It will be noted that oil level 40 and cap 34 define an air or gas space 42 in the top portion of upper tube 14. Further it will be understood that the volume of space 42 changes as upper tube 14 and lower tube 16 are telescopically forced into each other when, for example, front wheel 18 encounters a bump or the front brake is applied. For purposes of the present invention in the embodiment shown in FIG. 2 the oil level in upper tube 14 should be arranged so that when the front suspension is in the fully compressed position oil 40 does not pass or reach cap 34 and preferably oil level 40 is spaced slightly below cap 34 when the front forks are in the fully compressed position.

Further, for convenience, caps 34 may be provided with openings 46 which are provided with fittings to which is connected a hose or tube 48. A second hose or tube 50 is connected to tube 48 substantially as shown in FIG. 2.

For purposes of activating and deactivating anti-compression or anti-dive system 30, a switch, generally referred to as 52, is provided. Switch 52 can comprise a housing 54 which is connected to tube 50 at 56 to provide for gas or air flow thereto from tube 50. Housing 54 is provided with an opening 58 which is connected to gas reservoir 62 via tube or hose 60. Housing 54 also carries means 64 for stopping or controlling the flow of gas through the housing. Means 64 can comprise a stem 66 generally circularly in cross-section having a plate like section 67 securely fastened thereto. A spring 68 may be carried on stem 66 for purposes of opening means 64 after it has been used to close or stop gas flow through housing 54. Means 64 can be activated by cable 69 which in turn may be activated by front brakelever 24. That is, when lever 24 is pulled so as to activate the front brake, cable 69 operates simultaneously to close switch or valve 52. Brake cable 25 and cable 69 may be adjusted so as to close switch 52 just prior to the front brake engaging in order to provide for the greatest amount of resistance to compression.

A check valve 75 can be provided in anti-compression system 30 which operates to permit gas or fluid to escape from cylinder 62 even though valve 52 is closed. Thus, check valve 75 permits the front suspension to extend even though valve 52 is closed. Check valve 75 may comprise a housing 76 having a ball 77 and stop 78. Further, check valve 75 can be connected to line or tubing 50 and also connected to chamber 62 via tubing 79. While a check valve of the type shown has been used, it will be appreciated that other types of valve may be used and are contemplated within the purview of the invention.

With respect to valve 52, it will be understood that other types of valves may be used and may be activated by means other than the force used to operate the front brake. Valve 52 can be any means which operates to stop or control the gas flow to chamber 62. With respect to activation of valve 52, this may be operated by a hydraulic switch or solenoid brake switch or electromanetic connected to either front or back brake. Additionally, the force of brake backing plate or deceleration forces experienced on braking may be used to activate switch 52. Thus, other valves may be used and are contemplated within the purview of the invention.

With respect to chamber 62, it will be noted that a single chamber is provided. However, a double chamber may be used or chamber 62 may be divided into two chambers. One chamber may become operational when the back brake is applied since the back brake does not result in excessive front suspension compression. Thus a small increase in pressure in the anti-compression system is sufficient to maintain normal stability of the motorcycle, for example. The second chamber would become operational when the front brake is used, providing increased resistance to dive. In any event, it is preferred that any time the front brake is used that both chambers would become operational since greatest compression is experienced with front brake use.

While anti-compression system 30 has been illustrated outside fork tubes 14, the system may be made an integral part of the tubes with a gas volume in the top part of upper tube 14 being arranged to act similar to chamber 62. That is, valving 52 may be provided inside tube 14 or on the outside with gas being forced therethrough as a result of the front suspension being collapsed. Both tubes may be used.

It will be appreciated that the anti-compression system can be pressurized to provide the type of ride desired. Further, while a closed or sealed system has been shown, an open system may be utilized by removing chamber 62, for example, from the system. Additionally, the oil level may be raised or lowered to control the amount of resistance to front suspension compression. For example, the level 40 of oil 38 can be raised to permit very little or no telescoping movement of the front forks when the brakes are applied. However, providing little or no compression increases the harshness of the ride and its attendant problems. Adjustments to provide a controlled amount of gas between oil level 40 and valve 52 permits suspension to operate on a limited amount of travel. For example, in motorcycles used for motocross where twelve inches of travel is normal, the anti-compression system of the present invention can be adjusted to provide for six inches of travel when the brake is applied. This six inches of travel can be measured from a point where the front suspension is fully extended which is generally most preferred.

The anti-dive or anti-compression system in accordance with the present invention has among its advantages the fact it can provide for shorter braking distances. That is, the use of the present invention can result in shorter and more stable braking. It is believed that shorter braking distances can be achieved because the present invention on using the front brake resists the weight of the motorcycle being pushed or catapulted onto the front wheel. Accordingly more weight is provided on the rear wheel for braking. Additionally, braking can be more stable because the wheel base of the motorcycle utilizing the present invention does not shorten appreciably on application of the front brake and even on full application of the front brake limited travel remains in the front suspension.

Another advantage of the present invention resides in the fact that the front suspension can be adjusted for traveling over rough terrain to provide a comfortable, stable ride thereover without compromise. That is, the front suspension can be adjusted without being set-up to resist compression when the front brake is applied.

In operation, it will be noted that level 40 of oil 38 rises in tube 14 as bottom tube or slider 16 is telescopically forced over tube 14 as a bump or other unevenness is encountered. As oil level 40 rises in tube 14, it displaces gas therefrom via tubes 48 and 50, valve 52 and tube 60 into container or canister 62. As the oil level drops in tube 14 when the front suspension extends after having passed over the bump, gas flows from cannister 62 back into upper tube 14. When the front brake is applied valve 52 is closed and gas is not permitted to flow therethrough. Thus, since gas above oil level 40 has no place to flow, it resists the rise of oil level 40 in tube 14 and thus the tubes are restricted in their ability to compress telescopically into each other. Accordingly, it will be seen that the front brake can be applied effectively without the front end being excessively compressed.

Figure 3:
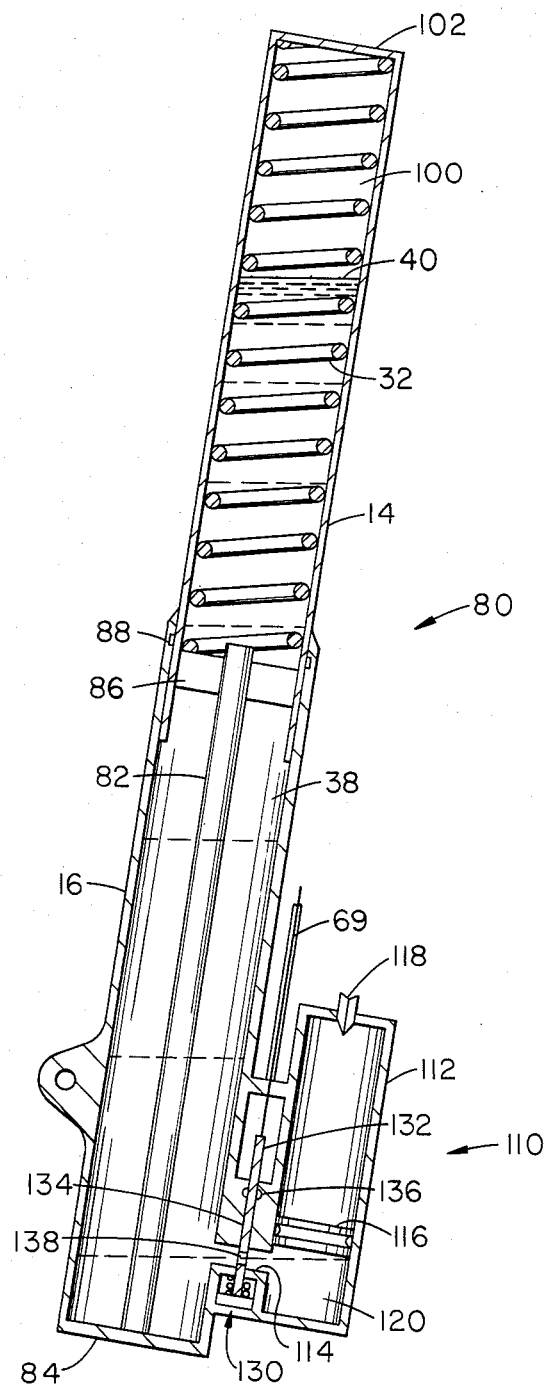
FIG. 3 is a cross-sectional view of a bottom tube or slider showing another embodiment of the anti-compression system in accordance with the invention.

In another aspect of the invention there is shown in FIG. 3 another embodiment for preventing or resisting compression of the front suspension assembly. In principle operation of the embodiment shown in FIG. 3 results in the front suspension compression stiffening by requiring that the pressure of the gas in upper tube 14 rise at a faster rate when the brakes are applied than without the brakes. Thus, in FIG. 3 there is shown a single fork assembly referred to generally as 80 having an upper tube 14 and a lower tube or slider 16. In lower tube 16 there is shown a damper rod 82 securely attached to bottom 84. Damper rod 82 has a piston 86. A seal 88 is provided in slider 16 and prevents leakage of oil. A spring means such as helical spring 32 is carried in the tubes and damping liquid such as oil 38 is carried in the tubes to dampen oscillating action of spring 32. It will be observed that the oil has a level 40 which defines a sealed gas space 100 at the top of tube 14. That is, tube 14, cap 102 and oil level 40 define a sealed gas space or chamber.

On lower tube or slider 16 is provided an anti-compression system 110 in accordance with the invention. The system 110 comprises a sealed reservoir or chamber 112 which is in liquid communication with lower tube 16. In the embodiment shown in FIG. 3, chamber 112 is securely fastened to slider 16 and a conduit 114 is provided therebetween to permit flow of damping liquid thereinto. Reservoir 112 is provided with a piston 116 and a gas valve 118, the piston providing a seal in reservoir 112 and defining a chamber 120 and 122 therein. Chamber 120 is provided for containing damping liquid and chamber 122 is provided for containing gas. It will be appreciated that both chambers vary in size as the forks are compressed and damping liquid is forced into chamber 120. Also, the reservoir may be divided into two chambers using a bladder.

A valve 130 is provided to control the flow of damping liquid to chamber 120. In the embodiment shown, the valve can comprise a rod 132 fitted in or received in a bore 134 having seals 136. Rod 132 can be activated by cable 69 connected to the front brake lever, for example. Rod 132 is provided with an opening 138 to permit damping liquid to pass therethrough to chamber 120. Thus, in operation when the front brake, for example, is applied rod 132 is moved upwardly in bore 134 and oil is no longer permitted to flow into chamber 120. Thereupon, liquid level 40 rises much faster in fork tube 14 accompanied by a much faster rise in pressure in sealed gas space 100 which resists compression of the fork. That is, when access to chamber 120 is closed the damping liquid is displaced upwardly in tube 14 and develops a greater rise in pressure in sealed gas space 100 which resists the compression of the forks.

While system 110 is shown near the bottom of tube 16, it may be located at any convenient location as long as access is made to the damping liquid and valves are provided to control the flow of the damping liquid.

While the invention has been descrived in terms of preferred embodiments, the claims appended hereto are intended to encompass other embodiments which fall within the spirit of the invention.

What is claimed is:

1. A telescopic front-end suspension system suitable for motorcycles comprising in combination:
   (a) a front tubular fork assembly having,
      (i) a pair of upper tubes,
      (ii) a pair of lower tubes slidably attached to said upper tubes to permit telescopic engagement of the tubes,
      (iii) spring means carried by said tubes to provide a spring rate,
      (iv) means for damping spring action including liquid carried in said tubes,
   (b) a chamber provided in fluid connection with at least one of said tubes for permitting a fluid to escape thereinto when said suspension system is compressed, and
   (c) control means for restricting the flow of said fluid to said chamber to increase the effective spring rate in at least one of said tubes upon application of brakes of said motorcycle, thereby restraining the collapse of said suspension system on braking.

2. The suspension system in accordance with claim 1 wherein the chamber is provided in connection with said upper tubes and said control means restricts the flow of gas thereto.

3. The suspension system in accordance with claim 1 wherein said chamber is in fluid connection with one of said lower tubes.

4. The suspension system in accordance with claim 1 wherein said control means restricts the flow of gas to said chamber.

5. The suspension system in accordance with claim 1 wherein said control means restricts the flow of liquid to said chamber.

6. The suspension system in accordance with claim 3 wherein said chamber connected to said lower tubes has variable size gas cavity and a variable size liquid cavity.

7. The suspension system in accordance with claim 1 including a braking mechanism and wherein said control means is activated by said braking system.

8. The suspension system in accordance with claim 7 wherein said braking system includes a front brake lever and said control means is activated by said lever.

9. The suspension system in accordance with claim 1 wherein a check valve is provided to permit fluid to escape from said chamber when control means is activated to restrict flow of fluid to said chamber.

10. The suspension system in accordance with claim 2 wherein a check valve is provided in fluid connection with said chamber and said upper tubes and permits gas to escape from said chamber to said tube when said control means restricts the flow of gas to said chamber.

11. The suspension system in accordance with claim 2 wherein gas chamber is open to atmosphere.

12. The suspension system in accordance with claim 1 wherein said chamber is pressurized with gas to increase the effective spring rate of said spring means.

13. A telescopic front-end suspension system suitable for motorcycles comprising:
   (a) a front fork assembly having,
      (i) a pair of upper tubes, (ii) a pair of lower tubes slidably attached to said upper tubes to permit telescopic engagement of the tubes, (iii) spring means carried by said tubes, (iv) means for damping spring action including liquid carried in said tubes, (b) a chamber provided in fluid connection with at least one of said upper tubes for permitting gas to escape thereinto when said suspension system is compressed and (c) control means for restricting the flow of said gas to said chamber upon application of brakes of said motorcycle, the control means operated by a brake lever thereby restraining the collapse of suspension on braking.

14. A telescopic front-end suspension system suitable for motorcycles comprising:

(a) a front fork assembly having, (i) a pair of upper tubes, (ii) a pair of lower tubes slidably attached to said upper tubes to permit said tubes to telescopic engagement of the tubes, (iii) spring means carried by said tubes to provide a spring rate, (iv) means for damping spring action including liquid carried in said tubes, (v) a first gas cavity in said tubes above said liquid, (b) a chamber having a liquid cavity and a second gas cavity, the liquid cavity provided in fluid connection with said lower tubes for permitting liquid to escape into the liquid cavity when said suspension system in compressed and, (c) control means for restricting the flow of said liquid to said liquid cavity upon application of brakes of said motorcycle, to increase the effective spring rate in said tubes by forcing liquid to compress gas in said first gas cavity thereby restraining the collapse of the suspension system on braking.

15. An apparatus for restraining the compression of a telescopic front-end suspension system for motorcycles and motorized tricycles, the suspension system comprised of a front tubular fork assembly having a pair of upper tubes, a pair of lower tubes slidably attached to said upper tubes permitting telescopic engagement of the tubes, spring means carried by said tubes and means for damping spring action including liquid carried in the tubes, the apparatus comprising:

(a) a chamber provided in fluid connection with at least one of said upper tubes for permitting gas to escape thereinto when said liquid rises in said upper tubes when said suspension system is compressed, and (b) control means for restricting the flow of said gas to said chamber to increase the effective spring rate in at least one of said upper tubes upon application of brakes of said motorcycle, thereby restraining the collapse of said suspension system on braking.

16. A telescopic front-end suspension system suitable for motorcycles comprising in combination;

(a) a front tubular fork assembly having, (i) a pair of upper tubes, (ii) a pair of lower tubes slidably attached to said upper tubes to permit telescopic engagement of the tubes, (iii) spring means carried by said tubes, (iv) means for damping spring action including liquid carried in said tubes, (b) a gas chamber provided in fluid connection with said upper tubes for permitting a gas to escape thereinto when said suspension system is compressed, and (c) control means for restricting the flow of gas to said chamber upon application of brakes of said motorcycle, thereby restraining the collapse of said suspension system on braking.

17. The suspension system in accordance with claim 16 wherein a check valve is provided in fluid connection with said chamber and said upper tubes and permits gas to escape from said chamber to said tubes when said control means restricts the flow of gas to said chamber.

18. The suspension system in accordance with claim 16 wherein said gas chamber is open to the atmosphere.

* * * * *